S. D. RIEGEL.
Adjustable Handle for Harrow.

No. 166,299.              Patented Aug. 3, 1875.

WITNESSES:                    INVENTOR:
                              Samuel D. Riegel
                              BY
                              ATTORNEYS.

UNITED STATES PATENT OFFICE.

SAMUEL D. RIEGEL, OF ADELPHI, OHIO.

IMPROVEMENT IN ADJUSTABLE HANDLES FOR HARROWS.

Specification forming part of Letters Patent No. 166,299, dated August 3, 1875; application filed June 19, 1875.

*To all whom it may concern:*

Figure 1:
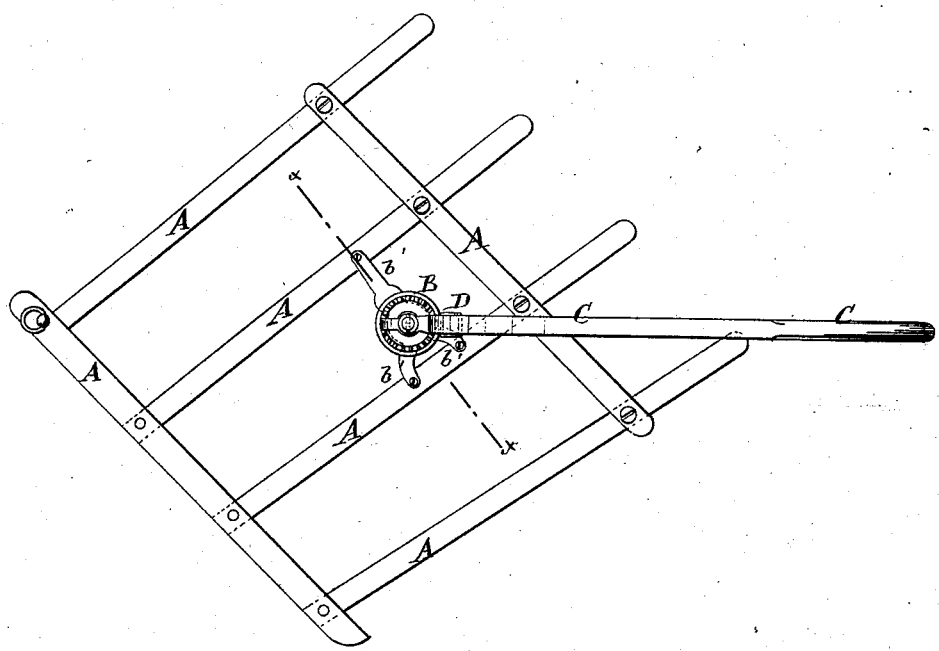
Figure 2:
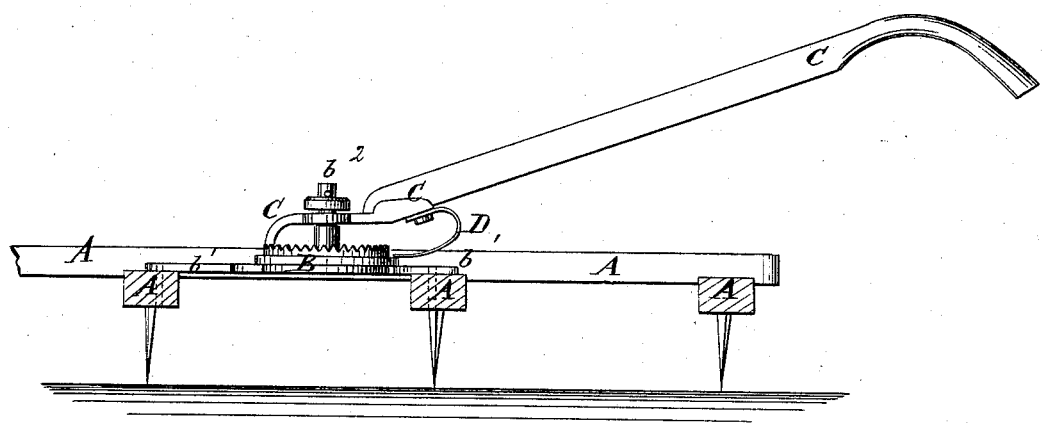

Be it known that I, SAMUEL D. RIEGEL, of Adelphi, in the county of Ross and State of Ohio, have invented a new and useful Improvement in Adjustable Handles for Harrows, of which the following is a specification:

Figure 1 is a top view of a harrow to which my improved handle has been applied. Fig. 2 is a cross-section of the same, taken through the line $x\ x$, Fig. 1.

Similar letters of reference indicate corresponding parts.

The object of this invention is to furnish an improved handle for harrows, which shall be so constructed that it may be instantly adjusted to enable any desired part of the harrow to be raised from the ground to pass obstructions, or to clear the harrow of rubbish, and to enable the harrow to be held in or to the right or left of the line of draft, as may be required, and which shall be simple in construction and convenient in use.

The invention consists in the combination of the ratchet-wheel, the pivoted handle, and the spring with the frame of a harrow, as hereinafter fully described.

A represents a harrow-frame, which may be of any desired form or size, and about the construction of which there is nothing new. B is a wheel or circular plate, upon the upper side of which is formed a circle of teeth, and which is provided with arms $b^1$, formed upon or attached to it, by means of which it is secured to the middle part of the frame A. To the center of the wheel B is attached, or upon it is formed, a stud, $b^2$, to which is pivoted the handle C near its end. The end of the handle C is bent downward, and has teeth formed upon it, corresponding with, and fitting into, the teeth of the wheel B. To the handle C, upon the other side of the stud $b^2$, is attached a spring, D, the free end of which rests upon a shoulder of the wheel B, as shown in Fig. 2, so as to hold the end of the handle pressed down upon the ratchet-wheel B. The outer part of the handle C, which may be made of wood, projects, so that its end may be reached and operated from any side of the harrow, toward which it may be turned. By this construction, by pressing the outer end of the handle C downward its forward end will be raised from the teeth of the wheel B, so that it may be turned toward any desired part of the harrow. Then, by raising the outer end of the handle C, the part of the harrow toward which the handle is turned will be raised from the ground, so as to pass over an obstruction or be cleared of rubbish. The handle C also enables the harrow to be held in the line of draft, or to the right or left of said line, as may be required.

Having thus described my invention, I claim as new and desire to secure by Letters Patent—

The combination of the ratchet-wheel B, the pivoted handle C, and the spring D with the frame of a harrow, substantially as herein shown and described.

SAML. D. RIEGEL.

Witnesses:
  JOHN S. MORRIS,
  J. A. LUTZ.